United States Patent [19]
Heflinger et al.

[11] Patent Number: 6,064,507
[45] Date of Patent: May 16, 2000

[54] HIGH SPEED DIFFERENTIAL OPTOELECTRONIC RECEIVER

[75] Inventors: Donald G. Heflinger; Phillip D. Hayashida, both of Torrance; Todd E. Humes, Thousand Oaks, all of Calif.; John D. Hyde, Corvallis, Oreg.

[73] Assignee: TRW Inc., Redondo Beach, Calif.

[21] Appl. No.: 09/206,912

[22] Filed: Dec. 7, 1998

Related U.S. Application Data

[63] Continuation-in-part of application No. 09/098,844, Jun. 17, 1996.

[51] Int. Cl.[7] .................................................. G02B 26/00
[52] U.S. Cl. ..................... 359/237; 359/189; 341/137; 341/143; 250/214 A; 250/214.1
[58] Field of Search ................................ 359/237, 238, 359/245, 189; 341/137, 143; 250/214 A, 214.1

[56] References Cited

U.S. PATENT DOCUMENTS

| | | | |
|---|---|---|---|
| 5,347,388 | 9/1994 | Little et al. | 359/189 |
| 5,477,370 | 12/1995 | Little et al. | 359/189 |
| 5,591,962 | 1/1997 | Koishi et al. | 250/214.1 |

OTHER PUBLICATIONS

Abbas, Gregory L., et al., "A Dual–Detector Optical Heterodyne Receiver for Local Oscillator Noise Suppression", Oct. 1985, pp. 1110–1122, IEEE J. of Lightwave Technology, vol. LT–3, No. 5.

Alexander, Stephen B., "Design of Wide–Band Optical Heterodyne Balanced Mixer Receivers", Apr. 1987, pp. 523–537, IEEE J. of Lightwave Technology, vol. LT–5, No. 4.

*Primary Examiner*—Loha Ben
*Attorney, Agent, or Firm*—Michael S. Yatsko; Robert W. Keller

[57] ABSTRACT

A high speed differential optoelectronic receiver comprises a first photodetector responsive to a first incident amplitude modulated optical signal and operative to develop a first electrical signal, a second photodetector responsive to a second incident amplitude modulated optical signal that is complementary to the first optical signal and operative to develop a second electrical signal, and an amplifier having a first input that is responsive to the first electrical signal and a second input that is responsive to the second electrical signal and is operative to provide a differential output signal that is proportional to the difference between the first and the second electrical signals. Also, a method for transforming complementary amplitude modulated optical signals into a complementary electrical output signal is invented.

24 Claims, 2 Drawing Sheets

HIGH SPEED DIFFERENTIAL OPTOELECTRONIC RECEIVER

CROSS-REFERENCE TO RELATED APPLICATIONS

This application is a continuation-in-part of U.S. patent application Ser. No. 09/098,844, filed on Jun. 17, 1998, entitled "All Optical Analog To Digital Converter", by Donald G. Heflinger, assigned to the same assignee as this present invention.

BACKGROUND OF THE INVENTION

1. Field of the Invention

The present invention relates generally to an optoelectronic receiver, and more particularly to a high speed differential optoelectronic receiver.

2. Description of the Prior Art

Optoelectronic receivers are known in the art. An example of a commercial optoelectronic receiver 10 is shown in FIG. 1. In such receiver two incident complementary amplitude modulated optical signals 12 and 14 are provided to a balanced detector including photodiodes 16 and 18, respectively, and the developed voltages are applied to the single input of an electronic amplifier 20. The optical signals may be either digital or analog. The electronic amplifier 20 converts the signal to an analog voltage level depending on the optical intensity delivered by the input amplitude modulated optical signals. Thus, when more light is delivered from one of the two complementary input signals, the electrical output of the amplifier is increased above the equilibrium level. When there is more light in the other complementary output, the output of the amplifier 20 is decreased below the equilibrium level. As illustrated, the photodiodes 16 and 18 are connected in series in a balanced configuration between the bias voltages +V and −V. The anode of photodiode 16 is connected to the cathode of photodiode 18. Each photodiode has an inherent capacitance associated with it. As will be explained later, this capacitance tends to limit the data rate performance of the receiver. When light 12 is applied to the photodiode 16, a current having a magnitude proportional to the intensity of the light in the first complementary output signal is conducted from the input of the electronic amplifier 20 in a direction as shown by the arrow 22 associated with the photodiode 16. Similarly, when light 14 is applied to the other photodiode 18, a current having a magnitude proportional to the intensity of the light in the second complementary optical signal is conducted in an opposite direction into the input of the electronic amplifier 20 as shown by the arrow 24 associated with the photodiode 18. If the resulting current is applied to the amplifier 20 in a first direction, then its first complementary output signal is greater in intensity. Similarly, if the resulting current is applied to the electronic amplifier 20 in a second direction, then the second complementary output signal is greater in intensity.

As is well known, the data rate of an optoelectronic receiver is limited by the magnitude of the capacitance present at the input of the electronic amplifier. This commercial balanced detector optoelectronic receiver 10 has an effective input capacitance associated with both the photodiodes 16 and 18. As configured, the serially connected diodes present twice the capacitance associated with a single photodiode, and thus unduly decrease the upper data rate achievable. Moreover, the performance of a high speed electronic amplifier 20 depends to some degree on the nature of the input current signal. Current signals that flow in only one direction, either into or out of, the electronic amplifier allow for a more straight forward amplifier design that yields higher performance. Electronic amplifiers designed to accommodate input currents that flow in both directions are more complex and can not easily achieve as high a performance. The conventional balanced detector optical receiver 10 that utilizes anode to cathode connected photodiodes must accommodate input currents that flow in both directions. Thus it is difficult to achieve the highest levels of performance from the electronic amplifier. In addition this receiver cannot utilize a commercially packaged photodiode with an internal resistor termination. Hence, it can not be impedance matched to transmission lines or the like which allow for detection by the photodiodes to occur at some distance from the amplifier. These limitations in the performance of this prior art optoelectronic receiver present difficulties in achieving a high speed optical communication system. Optoelectronic receivers of the type described are sold commercially by New Focus, Inc. of Santa Clara, Calif. as Models 1607 and 1617.

What is needed, therefore, is an optoelectronic receiver which is operable at higher data rates, and which can simplify broadband matching and allow for the photodiodes to be remotely located relative to the receiver amplifiers without compromising its high speed performance.

In addition, it is desirable to require that the high speed electronic amplifier only has to sink or source current at its input, thereby enabling the use of higher performance electronic amplifiers in the optoelectronic receiver.

SUMMARY OF THE INVENTION

The preceding and other shortcomings of the prior art are addressed and overcome by the present invention which provides, in a first aspect, a high speed differential optoelectronic receiver comprising a first photodetector responsive to a first incident amplitude modulated optical signal and operative to develop a first electrical signal, a second photodetector responsive to a second incident amplitude modulated optical signal that is complementary to the first optical signal and is operative to develop a second electrical signal, and an amplifier which has a first input that is driven by the first electrical signal and a second input that is driven by the second electrical signal, and is operative to provide a differential output signal that is proportional to the difference between the first and second electrical signals. The high speed differential optoelectronic receiver utilizes photodetectors or photodiodes, that are configured with the same polarity and is able to respond to both analog or digital signals.

In another aspect, the present invention provides a method for transforming complementary amplitude modulated optical signals into an electrical output signal comprising the steps of transducing first and second amplitude modulated optical signals and differentially amplifying the first and second signals to provide an electronic output signal that is proportional to the difference between the first and the second amplitude modulated input signals.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

DETAILED DESCRIPTION OF THE PREFERRED EMBODIMENTS

Figure 1:
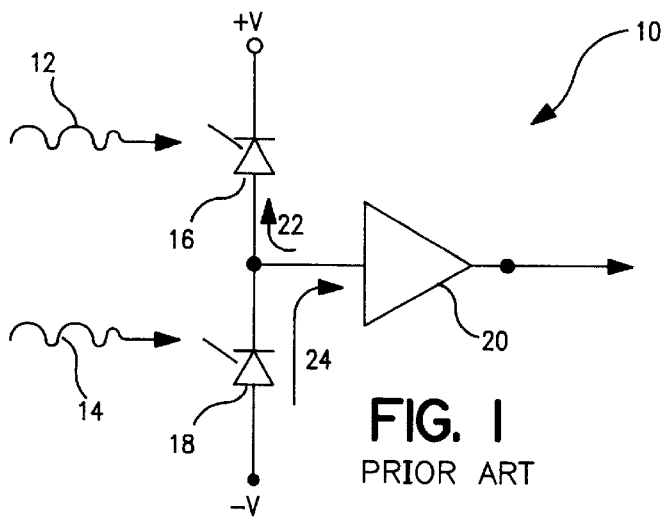
FIG. 1 is a schematic diagram of an optoelectronic receiver of the prior art.
Figure 2:
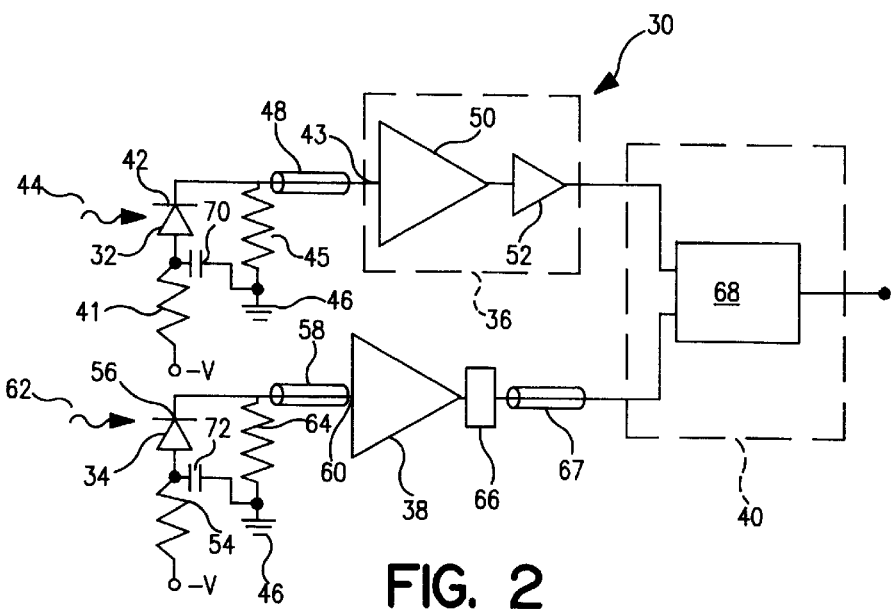
FIG. 2 is a schematic diagram of the high speed optoelectronic receiver in accordance with the present invention.

As illustrated in FIG. 2, the present invention provides a high speed differential optoelectronic receiver 30 that achieves higher data rate performance than the conventional balanced detector optoelectronic receiver of the prior art and which is capable of using resistively terminated photodiodes, thus allowing for impedance matching to transmission lines.

The receiver 30 includes a pair of photodetectors 32 and 34, amplifiers 36 and 38 and an output circuit 40. The photodetector 32 has its anode connected through a bias resistor 41 to a negative DC voltage (-V). A high frequency bypass capacitor 70 also connects this anode to ground 46 to provide a path for the high speed currents induced in the photodiode 32 by the high speed optical signal 44. The bias resistor 41 prevents these currents from trying to drive the negative DC voltage (-V). Ordinarily current is not drawn so the potential on the photodetector 32 is the same -V as is applied to the resistor. Its cathode 42 is connected to an input terminal 43 of the amplifier 36. By reverse biasing the photodetector 32 its internal depletion region is increased which in turn increases the distance between its contacts thus decreasing its associated capacitance. The photodetector 32 serves to convert an incident amplitude modulated optical signal 44 into an electrical drive current for subsequent amplification by the amplifier 36. The amount of current created is dependent upon the amount of incident light in the optical signal 44. An impedance matching resistor 45 is connected across photodetector 32 between the cathode 42 and ground 46 that develops an electrical drive voltage from the electrical drive current generated by the photodetector 32. A transmission line 48, preferably a RF transmission line or a coaxial cable, is connected between the resistor 45 and the input terminal 43. The amplifier 36 comprises two amplifiers 50 and 52 connected in cascade. The amplifiers 50 and 52 each serve to amplify and invert the electrical drive voltage applied to the input terminal 43. The effect of the two cascaded amplifiers is that no inversion results.

Similarly, the photodetector 34 has its anode connected through a bias resistor 54 to the negative DC voltage -V and also to a high frequency bypass capacitor 72, and its cathode 56 connected through a transmission line 58 to an input terminal 60 of the amplifier 38. This reverse bias arrangement reduces the capacitance associated with the photodetector 34. The photodetector 34 must be connected with the same polarity as that of photodetector 32 and converts an incident amplitude modulated optical signal 62 into an electrical drive current with a magnitude corresponding to the amount of light in the optical signal 62. This electrical drive current develops an electrical drive voltage across an impedance matching resistor 64 connected across the photodetector 34 between the cathode 56 and ground 46. This electrical drive voltage is applied to the amplifier 38 through the transmission line 58. The transmission lines 48 and 58 advantageously allow the photodetectors 32 and 34 to be remote or separated from the amplifiers 36 and 38, respectively, without compromising high speed performance. The transmission lines 48 and 58 may be conventional coaxial cables or impedance matched microstrip or stripline transmission lines. The amplifier 38 is of the high gain type and serves to invert and amplify the electrical drive voltage applied to its input 60. The amplification it provides is equal to or slightly greater than that provided by the cascaded amplifiers 50 and 52. Preferably, the output of the amplifier 38 is connected through an attenuator 66 and a delay line 67 to the output circuit 40. If the amplification provided by the amplifiers 50 and 52 is greater than that provided by amplifier 38 then the attenuator 66 would be included in the circuit after the amplifier 52. The attenuator 66 enables the magnitude of the amplified signal to be adjusted so that the magnitude of the amplified signals in the two paths are equal. The delay line is preferably a coaxial cable and serves to adjust the phase of the amplified signal and is of a length sufficient to cause delay so that the two amplified signals are in phase. Hence the amplified signal at the output of the single stage amplifier 38 is adjusted to be in phase with and of the same magnitude as that from the cascaded double stage amplifier 36. The output circuit 40 comprises a resistive power combiner 68 having its input terminals connected to the outputs of the amplifier 36 and the coaxial cable 67 and provides a single ended load.

In the preferred embodiment, the photodetectors 32 and 34 are resistively terminated photodiodes that include 50 ohm termination resistors 45 and 64, respectively, and are commercially available from Lasertron, Inc. as model QDMH 1-055. Such photodiodes have an internal capacitance of about 0.4 picofarad. By having each photodetector drive its own electronic amplifier it is possible to use commercial packaged photodiodes that are resistively terminated. This arrangement also allows the photodiodes to be individually biased to unique voltages enabling their frequency response to be individually tailored for a particular application. If the photodiodes are not resistively terminated the photodiode current is applied directly to drive the respective amplifiers and the application of transmission lines will not be possible. The transmission lines 48 and 58 are coaxial cables having a 50 ohm characteristic impedance. The amplifiers 36 and 38 are conventional RF amplifiers. One must have inverting gain relative to the others. The double stage (non-inverting) amplifier 36 is manufactured by SHF Design of Berlin, Germany and designated as Model 90. The single stage amplifier 38 is manufactured by Anritsu Company of Japan and designated as Model A3HB3102. The resistive power combiner 68 is manufactured by Wienschel and designated as Part 1580. It provides an input impedance back toward the amplifiers 36 and 38 of 50 ohms and an output impedance at the output of circuit 40 of 50 ohms.

In operation the incident amplitude modulated optical signals 44 and 62 must be complementary. Complementary means that any increase in light in one photodetector is accompanied by a decrease of light in the other photodetector. Since the light is complementary, the photo current created by the photodetector 32 drives its amplifier 36 solely since there is no common electrical connection to the photodetector 32. Similarly, the photo current created by the photodetector 34 drives amplifier 38 solely. By orienting both photodetectors with the same polarity on the input of the amplifiers, an enhanced performance electronic amplifier can be used since it only has to sink the photo currents flowing in one direction from the photodetectors. Moreover, the capacitance appearing at the input of each of the amplifiers is only that associated with its corresponding photodetector. This is only one-half the capacitance appearing at the input of the amplifier of the prior art commercial optoelectronic receiver. The enhanced electronic amplifier performance and reduced capacitance enables this inventive differential optoelectronic receiver to achieve higher data rate performance.

When the incident amplitude modulated optical signal 44 is applied to the photodiode 32 it creates an electrical current having a magnitude proportional to the intensity of the light in the first signal 44. The electrical current is converted to a voltage by the resistor 45, which voltage is applied to the input 43 of amplifier 36. Similarly, when a complementary incident amplitude modulated optical signal 62 is applied to the photodiode 34 it creates a current having a magnitude proportional to the intensity of the light in the second complementary signal 62. The current is converted to a voltage by the resistor 64 which is applied to the input 60 of amplifier 38. Similarly, the currents applied to the electronic amplifier 36 and 38 are both in a sinking manner or direction. The amplifiers 36 and 38 amplify the signals at their inputs with amplifier 38 also providing an inversion and by means of the attenuator 66 and delay line 67 which attenuates the amplitude and delays the phase respectively the output signal from the amplifier 38 creates signals to the output circuit 40 that have equal amplitude and are in phase. A single ended signal is provided at the output of the impedance matched output circuit.

As will be recognized the receiver is a linear system. This produces a differential output signal that is proportional to the difference between the two signals applied to the input terminals of the amplifiers 36 and 38. This difference is in the algebraic sense such that for equal amplitudes the magnitude is twice that of one of the signals. Also the photodetectors could have a positive supply voltage applied to their cathodes with both anodes providing the input to the amplifiers.

This receiver provides noise rejection capability because the incident optical signals must be complementary. If the incident optical signals are both present or both absent then there would not be an output.

Figure 3:
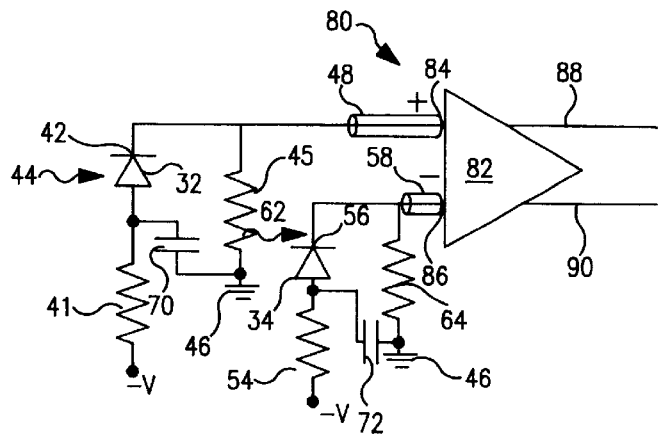
FIG. 3 is a schematic diagram of an alternative embodiment of the high speed optoelectronic receiver in accordance with the present invention.
Figure 4:
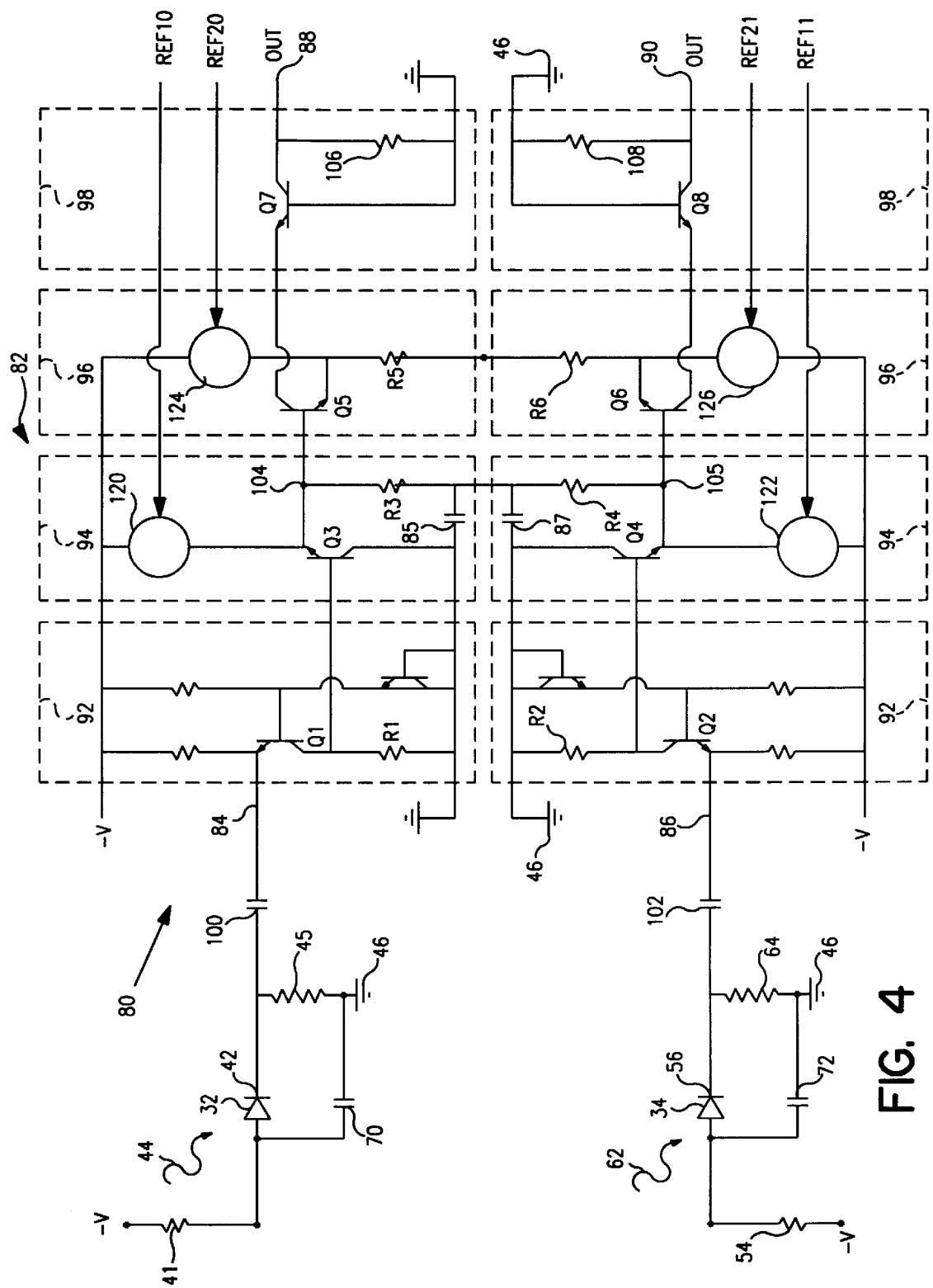
FIG. 4 is a more detailed schematic diagram of an integrated circuit embodiment of the high speed differential optoelectronic receiver illustrated in FIG. 3.

Referring now to FIG. 3 and to FIG. 4, an alternative embodiment of the present invention is shown. FIG. 4 illustrates the schematic diagram of an integrated circuit embodiment of the high speed differential optoelectronics receiver, generally designated by the numeral 80. The difference between this high speed differential optoelectronic receiver 80 and the optoelectronic receiver shown in FIG. 2 is that it includes a differential amplifier 82 having inputs 84 and 86 and outputs 88 and 90. FIGS. 3 and 4 contain many of the same elements as were shown and described in FIG. 2 and like numerals have been provided for those elements.

Briefly, the two current signals applied to the inputs 84 and 86 are treated as a differential electronic input. As will be described subsequently, the differential amplifier 82 is also referred to as a differential transimpedance amplifier and utilizes two internal identical amplifiers for each input to give two complementary outputs (see the mirror circuits in the upper and lower portions of FIG. 4). This is in contrast to the embodiment presented in FIG. 2 where amplifier 38 provided an inverted output relative to amplifier 36. The two internal identical amplifiers are operated differentially by connecting a common potential, known as a common mode voltage, between the amplifiers. The signals appearing on the outputs 88 and 90 are complementary and proportional to the difference between the electrical signals appearing on the inputs 84 and 86, respectively. As in the previous embodiment, the incident optical signals 44 and 62 are complementary and amplitude modulated and may be either of an analog or a digital type.

The optoelectronic receiver 80 includes photodetectors 32 and 34, termination resistors 45 and 64 and the differential amplifier that comprises two sets of four stages, namely common base input stages 92, emitter follower stages 94, differential gain stages 96 and common base output stages 98. The amplifier 82 comprises the integrated circuit, which is formed of a semiconductor material. The amplifier is a heterojunction bipolar transistor (HBT) dual input transimpedance amplifier (HAMP) and has been fabricated from indium phosphide and gallium arsenide. Similar amplifiers also could be fabricated from silicon, silicon germanium or any other semiconductor process. The photodetectors 32 and 34 and termination resistors 45 and 64 are purchased commercially and are not part of the integrated circuit. Blocking capacitors 100 and 102 prevent current developed on the emitters of transistors Q1 and Q2 in the input stage 92 from flowing into the termination resistors 45 and 64, respectively, to ground. The blocking capacitors 100 and 102 have a capacitance sufficient to prevent such current flow over the entire frequency range of operation and are preferably 3 microfarads. The high frequency bypass capacitors 70 and 72 enable both anodes of the photodetectors 32 and 34 to be reversed biased with the −V DC potential while providing a path for any AC signals to ground. Generally this bypass capacitor is part of the commercial photodetector-termination resistance package.

In the amplifier 82 the common base input stage 92 uses common base transistors Q1 and Q2 to create low input impedance that is matched to the input impedance provided by the termination resistors 45 and 64, which is important because the photodiode capacitance affects the amplifier bandwidth as previously described. Transimpedance resistors R1 and R2 at the collector outputs of Q1 and Q2 convert the photodiode currents generated by the photodetectors 32 and 34 to voltages without increasing the RC time constant of the circuit. The high impedance outputs of Q1 and Q2 are buffered by the Darlington-configured emitter follower stage 94 having transistors Q3 and Q4 with a loss of about 1 dB. The emitter follower outputs are loaded with resistors R3 and R4 to AC virtual ground nodes 104 and 105 and provides impedances that are matched to that of the differential gain stages 96. This helps to stabilize the emitter follower stage 94 and reduce frequency domain peaking.

The differential gain stages 96 includes transistors Q5 and Q6 to generate a differential output signal proportional to the difference between the two input currents at inputs 84 and 86. This also provides an additional 5 dB of gain. Resistors R5 and R6 provide emitter degeneration that increases the linearity and bandwidth of the stages at the cost of lower gain. The differential stages output current is buffered by the common base output stages 98 that comprise transistors Q7 and Q8. This increases amplifier bandwidth by reducing the Miller capacitance associated with the transistors. The outputs 88 and 90 are fully back terminated with 50 ohm resistors 106 and 108 to improve output return loss and provides a differential output signal that is proportional to the two signals applied to the input terminals 84 and 86.

The emitter follower and differential gain stages 94 and 96 are biased with simple current mirror current source circuits 120, 122, 124 and 126. The current sources are programmable and controlled to have a magnitude determined by the reference voltages REF 10, REF 11, REF 20 and REF 21, respectively. The current setting resistors (not shown) for these current sources are connected to separate pads for maximum flexibility in circuit evaluation.

As shown in FIG. 3, coaxial cables 48 and 58 could be inserted to separate the amplifier from the photodetectors. Also, it should be noted that individual photodetector die without resistive termination can be mounted directly on the surface of, or fabricated as part of the integrated circuit amplifier 82 without the use of transmission lines, coaxial cables or the like.

Obviously, many modifications and variations of the present invention are possible in light of the above teachings. Thus, it is to be understood that, within the scope of the appended claims, the invention may be practiced otherwise than as specifically described above.

What is claimed is:

1. A high speed differential optoelectronic receiver comprising:
    a first photodetector responsive to a first incident amplitude modulated optical signal and operative to develop a first electrical signal;
    a second photodetector responsive to a second incident amplitude modulated optical signal that is complementary to said first optical signal and operative to develop a second electrical signal; and
    amplifier means having a first input that is responsive to said first electrical signal and a second input that is responsive to said second electrical signal, said amplifier means being operative to provide a differential output signal that is proportional to the difference between said first and second electrical signals.

2. The high speed differential optoelectronics receiver of claim 1, wherein said photodetectors are configured with the same polarity.

3. The high speed differential optoelectronics receiver of claim 1, wherein said first optical signal and said second optical signal are analog signals.

4. The high speed differential optoelectronics receiver of claim 1, wherein said first optical signal and said second optical signal are digital signals.

5. The high speed differential optoelectronic receiver of claim 1, wherein said first and said second electrical signals are current signals.

6. The high speed differential optoelectronic receiver of claim 1 and further comprising a first resistor coupled to the first photodetector and a second resistor coupled to the second photodetector, said first and second resistors serving to provide an input load so as to enable impedance matching.

7. The high speed differential optoelectronic receiver of claim 6, wherein said first and said second electrical signals are voltage signals developed from said first and second resistors, respectively.

8. The high speed differential optoelectronics receiver of claim 6 and further comprising a transmission line coupled between said first resistor and said amplifier means for matching the impedance of said first resistor and said amplifier means.

9. The high speed differential optoelectronic receiver of claim 1 wherein said photodetectors are photodiodes.

10. The high speed differential optoelectronics receiver of claim 1, wherein said amplifier means comprises a first amplifier coupled to said first photodetector for amplifying said first electrical signal and a second amplifier coupled to said second photodetector for amplifying and inverting said second electrical signal.

11. The high speed differential optoelectronics receiver of claim 10 and further comprising delay means coupled to said second amplifier to delay said amplified and inverted second electrical signal, such that said amplified and inverted second electrical signal is in phase with said amplified first electrical signal.

12. The high speed differential optoelectronics receiver of claim 1, wherein said amplifier means provides a second output signal that is complementary to said differential output signal.

13. The high speed differential optoelectronics receiver of claim 1, wherein said amplifier means comprises a common base input stage for providing a relatively low input impedance and a relatively high output impedance, an emitter follower for buffering the relatively high output impedance, and a differential gain stage for developing said differential output signal that is proportional to the difference between said first and second electrical signals.

14. The high speed differential optoelectronics receiver of claim 1, wherein said amplifier means comprises a differential transimpedance amplifier.

15. The high speed differential optoelectronics receiver of claim 1, wherein said amplifier means comprises an integrated circuit.

16. The high speed differential optoelectronics receiver of claim 15, wherein said integrated circuit is formed from a semiconductor material.

17. The high speed differential optoelectronics receiver of claim 1, wherein said integrated circuit is formed of indium phosphide material.

18. The high speed differential optoelectronics receiver of claim 1, wherein said integrated circuit is formed of gallium arsenide material.

19. The method of transforming complementary amplitude modulated optical signals into a complementary electrical output signal comprising:
    transducing a first amplitude modulated optical signal into a first electrical signal;
    transducing a second amplitude modulated optical signal that is complementary to said first optical signal into a second electrical signal; and
    differentially amplifying said first and second electrical signals to provide an electronic output signal that is proportional to the difference between said first and said second electrical signals.

20. The method of claim 19, wherein said complementary amplitude modulated optical signals are analog signals.

21. The method of claim 19, wherein said complementary amplitude modulated optical signals are digital signals.

22. The method of claim 19, and further comprising the step of matching the impedance on either end of said first and second electrical signals.

23. The method of claim 19, wherein the step of differentially amplifying comprises amplifying said first electrical signal, and amplifying and inverting said second electrical signal.

24. The method of claim 19, and further comprising the step of delaying said amplified first electrical signal such that said first and said second electrical signals are in phase.

* * * * *